US010826736B2

(12) United States Patent
Tiirola et al.

(10) Patent No.: US 10,826,736 B2
(45) Date of Patent: Nov. 3, 2020

(54) RESERVING TIME ALIGNMENT PERIOD FOR OFDMA COMMUNICATIONS WITH DIFFERENT NUMEROLOGY PARAMETERS

(71) Applicant: Nokia Solutions and Networks Oy, Espoo (FI)

(72) Inventors: Esa Tapani Tiirola, Kempele (FI); Kari Pekka Pajukoski, Oulu (FI); Eeva Lahetkangas, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/301,126

(22) PCT Filed: May 13, 2016

(86) PCT No.: PCT/EP2016/060860
§ 371 (c)(1),
(2) Date: Nov. 13, 2018

(87) PCT Pub. No.: WO2017/194159
PCT Pub. Date: Nov. 16, 2017

(65) Prior Publication Data
US 2019/0306855 A1    Oct. 3, 2019

(51) Int. Cl.
*H04L 27/26* (2006.01)
*H04W 72/04* (2009.01)

(52) U.S. Cl.
CPC ...... *H04L 27/2602* (2013.01); *H04L 27/2605* (2013.01); *H04L 27/2607* (2013.01); *H04L 27/2655* (2013.01); *H04W 72/0446* (2013.01)

(58) Field of Classification Search
CPC ............ H04L 27/2602; H04L 27/2605; H04L 27/2607; H04L 27/2655; H04L 27/2656;
(Continued)

(56) References Cited

U.S. PATENT DOCUMENTS 10,356,800 B2 * 7/2019 Manolakos ......... H04L 27/2602
2016/0353436 A1 * 12/2016 Au ........................ H04L 5/1469

FOREIGN PATENT DOCUMENTS

EP    2 151 945 A2    2/2010

OTHER PUBLICATIONS

Chin-Wei Chu et al., "Design of an OFDMA Baseband Receiver for 3GPP Long-Term Evolution," IEEE International Symposium on VLSI Design, Automation and Test, pp. 196-199, XP031272469, 2008.
(Continued)

*Primary Examiner* — Pao Sinkantarakorn
(74) *Attorney, Agent, or Firm* — Fay Sharpe LLP

(57) ABSTRACT

Coexistence of OFDM transmissions with different sampling rates, subcarrier spacing, symbol duration, bandwidths, but a constant FFT size, all with the same integer ratio (downclocking or upclocking) N=2, 4, 8 ... Now called different numerology. Problem of Time alignment due to the presence of alternating long CP and short CPs in a slot. At the slot level the transmissions are aligned, but not at the symbol level. The application proposes to send after the first symbol for N=1 a so-called Time Alignment Period of same duration for each transmission in order allegedly to allow the network nodes to synchronize their timings or clocks without interfering with the transmission or reception of any symbols or CPs of other transmissions.

14 Claims, 11 Drawing Sheets

(58) Field of Classification Search
CPC .... H04L 27/2662–2666; H04L 27/2673–2679
See application file for complete search history.

(56) References Cited

OTHER PUBLICATIONS

Nokia et al., "Flexible numerology for 5G New Radio," $3^{rd}$ Generation Partnership Project (3GPP), 3GPP TSG-RAN WG1 Meeting #84bis, R1-162894, 5 pages, XP051079735, Busan, Korea, Apr. 11-15, 2016.
International Search Report for PCT/EP2016/060860 dated Feb. 1, 2017.

* cited by examiner

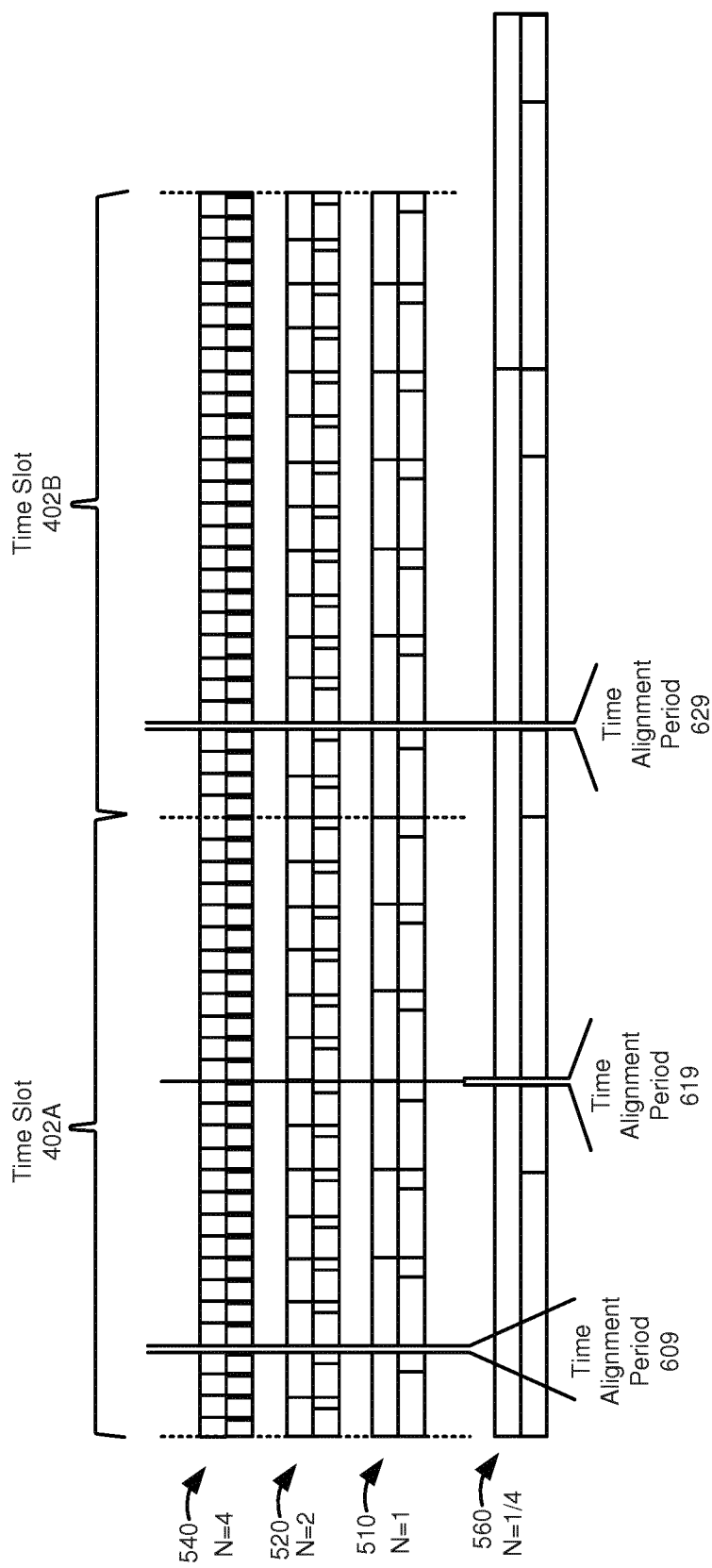

RESERVING TIME ALIGNMENT PERIOD FOR OFDMA COMMUNICATIONS WITH DIFFERENT NUMEROLOGY PARAMETERS

TECHNICAL FIELD

This description relates to wireless networking.

BACKGROUND

In Orthogonal Frequency Division Multiple Access (OFDMA) communication, different numerology parameters may cause time domain parameters such as symbol length to be scaled down by a parameter N, whereas frequency parameters such as subcarrier spacing may be scaled up by the same parameter N.

SUMMARY

A method may include wirelessly transmitting, by a network node, N OFDMA symbols commencing at a beginning of a time slot, N being a first value of a numerology parameter associated with the N symbols, reserving a time alignment period within the time slot, the time alignment period being later than commencement of the time slot and before transmission of an N+1$^{TH}$ OFDMA symbol, and transmitting, after the N OFDMA symbols and the time alignment period and during the time slot, the N+1$^{TH}$ OFDMA symbol without reserving another time alignment period within the time slot.

A non-transitory computer-readable storage medium may comprise instructions stored thereon. When executed by at least one processor, the instructions may be configured to cause a network node to wirelessly transmit N OFDMA symbols commencing at a beginning of a time slot, N being a first value of a numerology parameter associated with the N symbols, reserve a time alignment period within the time slot, the time alignment period being later than commencement of the time slot and before transmission of an N+1$^{TH}$ OFDMA symbol, and transmit, after the N OFDMA symbols and the time alignment period and during the time slot, the N+1$^{TH}$ OFDMA symbol without reserving another time alignment period within the time slot.

An apparatus may be configured to wirelessly transmit N OFDMA symbols commencing at a beginning of a time slot, N being a first value of a numerology parameter associated with the N symbols, reserve a time alignment period within the time slot, the time alignment period being later than commencement of the time slot and before transmission of an N+1$^{TH}$ OFDMA symbol, and transmit, after the N OFDMA symbols and the time alignment period and during the time slot, the N+1$^{TH}$ OFDMA symbol without reserving another time alignment period within the time slot.

An apparatus may comprise at least one processor and a non-transitory computer-readable storage medium comprising instructions. When executed by the at least one processor, the instructions may be configured to cause a network node to wirelessly transmit N OFDMA symbols commencing at a beginning of a time slot, N being a first value of a numerology parameter associated with the N symbols, reserve a time alignment period within the time slot, the time alignment period being later than commencement of the time slot and before transmission of an N+1$^{TH}$ OFDMA symbol, and transmit, after the N OFDMA symbols and the time alignment period and during the time slot, the N+1$^{TH}$ OFDMA symbol without reserving another time alignment period within the time slot.

A network node may comprise means for wirelessly transmitting N OFDMA symbols commencing at a beginning of a time slot, N being a first value of a numerology parameter associated with the N symbols, means for reserving a time alignment period within the time slot, the time alignment period being later than commencement of the time slot and before transmission of an N+1$^{TH}$ OFDMA symbol, and means for transmitting, after the N OFDMA symbols and the time alignment period and during the time slot, the N+1$^{TH}$ OFDMA symbol without reserving another time alignment period within the time slot.

A method may include wirelessly receiving, by user equipment from a base station, N OFDMA symbols commencing at a beginning of a time slot, N being a first value of a numerology parameter associated with the N OFDMA symbols, reserving a time alignment period within the time slot, the time alignment period being later than commencement of the time slot and before reception of an N+1$^{TH}$ OFDMA symbol, and receiving from the base station, after the time alignment period, at least one additional OFDMA symbol, the at least one OFDMA symbol being associated with a second value M of the numerology parameter, M being a different integer value than N.

A non-transitory computer-readable storage medium comprising instructions that, when executed by at least one processor, are configured to cause a user equipment to wirelessly receive, from a base station, N OFDMA symbols commencing at a beginning of a time slot, N being a first value of a numerology parameter associated with the N OFDMA symbols, reserve a time alignment period within the time slot, the time alignment period being later than commencement of the time slot and before reception of an N+1$^{TH}$ OFDMA symbol, and receive from the base station, after the time alignment period, at least one additional OFDMA symbol, the at least one OFDMA symbol being associated with a second value M of the numerology parameter, M being a different integer value than N.

An user equipment may be configured to wirelessly receive, from a base station, N OFDMA symbols commencing at a beginning of a time slot, N being a first value of a numerology parameter associated with the N OFDMA symbols, reserve a time alignment period within the time slot, the time alignment period being later than commencement of the time slot and before reception of an N+1$^{TH}$ OFDMA symbol, and receive from the base station, after the time alignment period, at least one additional OFDMA symbol, the at least one OFDMA symbol being associated with a second value M of the numerology parameter, M being a different integer value than N.

An apparatus may include at least one processor and a non-transitory computer-readable storage medium comprising instructions stored thereon. When executed by the at least one processor, the instructions may be configured to cause a user equipment to wirelessly receive, from a base station, N OFDMA symbols commencing at a beginning of a time slot, N being a first value of a numerology parameter associated with the N OFDMA symbols, reserve a time alignment period within the time slot, the time alignment period being later than commencement of the time slot and before reception of an N+1$^{TH}$ OFDMA symbol, and receive from the base station, after the time alignment period, at least one additional OFDMA symbol, the at least one OFDMA symbol being associated with a second value M of the numerology parameter, M being a different integer value than N.

A network node may comprise means for wirelessly receiving, from a base station, N OFDMA symbols commencing at a beginning of a time slot, N being a first value of a numerology parameter associated with the N OFDMA symbols, means for reserving a time alignment period within the time slot, the time alignment period being later than commencement of the time slot and before reception of an $N+1^{TH}$ OFDMA symbol, and means for receiving from the base station, after the time alignment period, at least one additional OFDMA symbol, the at least one OFDMA symbol being associated with a second value M of the numerology parameter, M being a different integer value than N.

The details of one or more implementations are set forth in the accompanying drawings and the description below. Other features will be apparent from the description and drawings, and from the claims.

BRIEF DESCRIPTION OF THE DRAWINGS

FIG. 6 is a diagram showing coexistence of numerologies for N=1, N=2, N=4, and N=¼ according to an example implementation.

DETAILED DESCRIPTION

Figure 1:
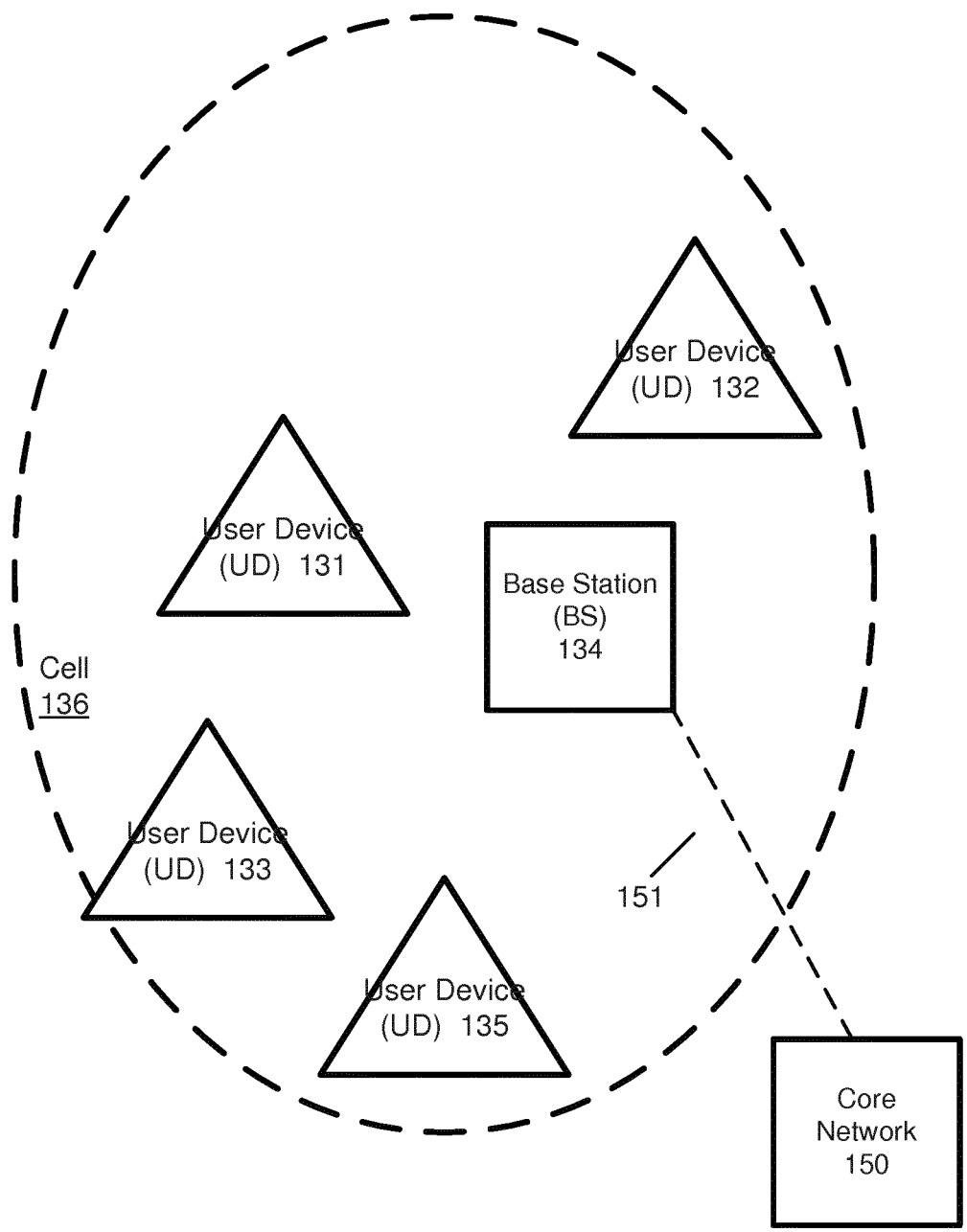
FIG. 1 is a block diagram of a wireless network 130 according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP) or an enhanced Node B (eNB). At least part of the functionalities of an access point (AP), base station (BS) or (e)Node B (eNB) may be also be carried out by any node, server or host which may be operably coupled to a transceiver, such as a remote radio head. Base station 134 provides wireless coverage within a cell 136, including to user devices 131, 132, 133 and 135. Although only four user devices 131, 132, 133, 135 are shown as being connected or attached to Base station 134, any number of user devices may be provided. Base station 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies or wireless networks, such as LTE, LTE-A, 4G, 5G, cmWave and/or mmWave band networks (which may be part of 5G), or any other wireless network. LTE, 4G, 5G, cmWave and mmWave band networks are provided only as illustrative examples, and the various example implementations may be applied to any wireless technology/wireless network.

The base station 134 and user devices 131, 132, 133, 135 may transmit and receive signals to and from each other by orthogonal frequency division multiple access (OFDMA). The OFDMA communications may utilize a scalable air interface, in which various time and frequency components may be scaled by a numerology parameter N. The scaling may enable compatible subframe/radio frame timing to allow fluent switching between 4G/LTE-Advanced/LTE-Advanced Pro and different 5G scenarios. A common system clock for all systems (4G/LTE-Advanced/LTE-Advanced Pro, 5G) may maximize utilization the common hardware resources of the systems. For example, a single base station may support multiple radio technologies, such as 2G/3G/4G and 5G. In time division duplexing (TDD) systems, it may be desirable to run the different systems with the same hardware resources so that transmission and reception timing of the systems can be aligned without additional guard time. In some coexistence scenarios, different systems may use the same subcarrier spacing, such as a 5G system using 15 kHz subcarrier spacing and symbol timing according to LTE. This may enable running a 5G system based on an LTE clock and align transmissions with the granularity of one LTE symbol, such as when considering LTE TDD and special subframes (such as downlink pilot time slot (DwPTS) and/or uplink pilot time slot (UpPTS)).

A TDD base station, such as the base station 134, may not be able to transmit and receive simultaneously (thus, it can be considered as a half-duplex node). It may be desirable to align transmission, reception, and guard periods (GPs) as much as possible. Aligning symbols between communications using different numerology parameters may minimize overhead due to the guard periods.

Time-frequency scaling generates various numerologies related to LTE operation. The time-frequency scaling may change subcarrier spacing based on a numerology parameter N, such as by increasing subcarrier spacing in proportion to the value of N. Time-frequency scaling may also change symbol duration inversely proportionally to the value of N.

Cyclic prefixes (CPs) may be added to a beginning and/or end of OFDMA symbols to address timing issues in multipath channels. CPs may serve as guard intervals, eliminating intersymbol interference from previous symbols. CPs may also, as repetitions of the end of the symbol, allow network nodes to perform linear convolution of a frequency-selective multipath channel to be modelled as circular convolution, which the network nodes may transform to the frequency domain using a discrete Fourier transform, allowing for simple frequency-domain processing, such as channel estimation and equalization. A first CP in a time slot may have a longer time duration than subsequent CPs. The different CP time durations may cause OFDMA transmissions with different numerology parameter values to transmit symbols with different ending times from each other. The different ending times may make it difficult for a base station 134 to synchronize signals during a time slot in which symbols associated with different numerology parameter values are being transmitted, because the signal would have to intersect at least one symbol.

The below table shows an example of LTE numerology with normal cyclic prefix length, with and without clock rate scaling, for numerology parameter N values of 1, 2, and 4:

| T-F Scaling | 1 | 2 | 4 |
| --- | --- | --- | --- |
| Max Carrier BW [MHz] | 25 | 100 | 200 |
| Clock Rate [Mchip/s] | 30.72 | 61.44 | 122.88 |
| Subcarrier spacing [kHz] | 15 | 30 | 60 |
| Symbol period (μs) | 66.67 | 33.33 | 16.67 |
| Fast Fourier Transform size | 2,048 | 2,048 | 2,048 |
| Samples per 10 ms | 307,200 | 614,400 | 1,228,800 |
| Samples per 0.5 ms | 15,360 | 30,720 | 61,440 |
| Samples per short CP | 144 | 144 | 144 |
| Samples per long CP | 160 | 160 | 160 |
| Symbols per 0.5 ms | 7 | 14 | 28 |
| Short CP duration (μs) | 4.69 | 2.34 | 1.17 |
| CP overhead (%) | 6.67 | 6.67 | 6.67 |

The below table shows an example of LTE numerology with normal cyclic prefix length, with and without symbol length scaling, for numerology parameter N values of 1, 2, and 4:

| T-F Scaling | 1 | 2 | 4 |
| --- | --- | --- | --- |
| Clock Rate [Mchip/s] | 30.72 | 61.44 | 122.88 |
| Subcarrier spacing [kHz] | 15 | 30 | 60 |
| Symbol period (μs) | 66.67 | 33.33 | 16.67 |
| Fast Fourier Transform size | 2,048 | 2,048 | 2,048 |
| Samples per 10 ms | 307,200 | 614,400 | 1,228,800 |
| Samples per 0.5 ms | 15,360 | 30,720 | 61,440 |
| Samples per short CP | 144 | 144 | 144 |
| Samples per long CP | 160 | 160 | 160 |
| Symbols per 0.5 ms | 7 | 14 | 28 |
| Short CP duration (μs) | 4.69 | 2.34 | 1.17 |
| CP overhead (%) | 6.67 | 6.67 | 6.67 |

Figure 2:
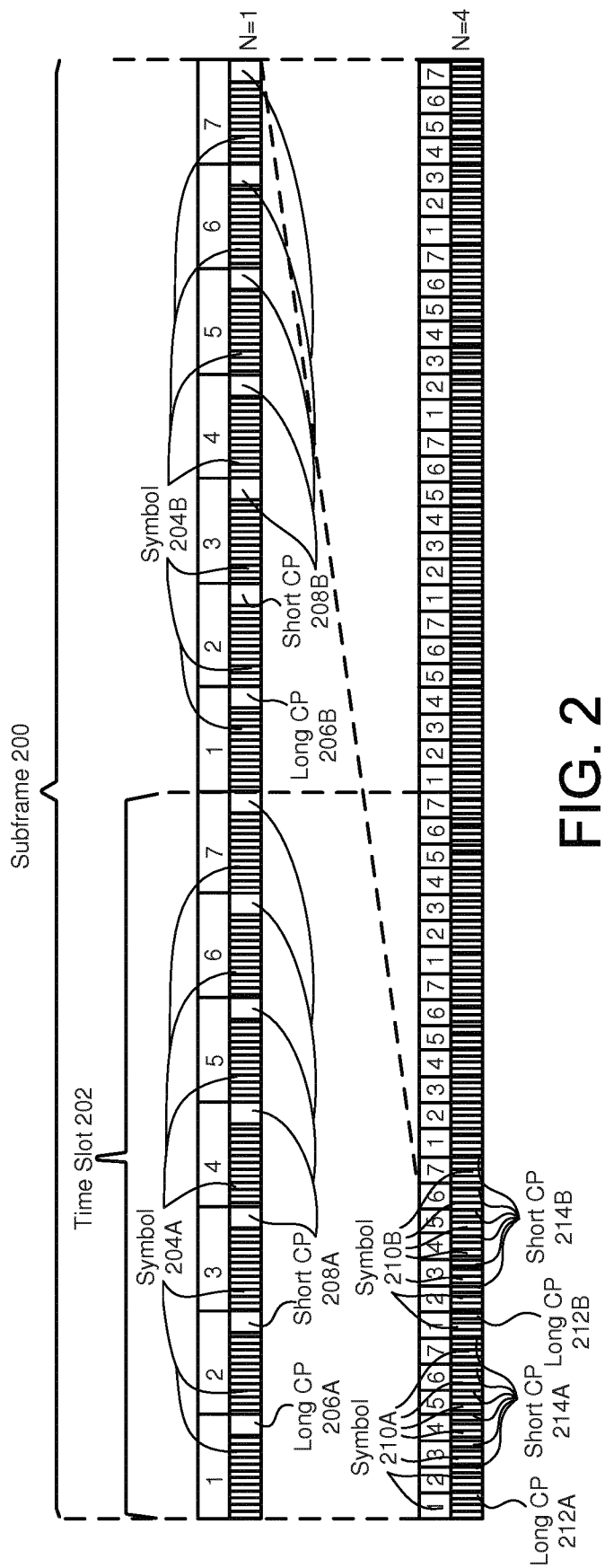
FIG. 2 is a diagram showing upscaling from N=1 to N=4 according to an example implementation.

FIG. 2 is a diagram showing upscaling from N=1 to N=4 according to an example implementation. In the example shown in FIG. 2, for N=1, the base station 134 and/or user equipment 131, 132, 133, 135 may transmit a predetermined number, such as seven, symbols 204A, in a time slot 202. Each of the symbols 204A may be preceded or succeeded by a cyclic prefix 206A, 208A. A long cyclic prefix 206A, which is the first cyclic prefix in the time slot 202, may be longer than the short cyclic prefixes 208A, which are subsequent cyclic prefixes in the time slot 202. In the example described in the tables above, the long cyclic prefix 206A is 160 samples long (with the 0.5 millisecond time slot 202 being divided into 15,360 samples for N=1), and the short cyclic prefixes 208A are 144 samples long, for a difference of 16 samples. A subsequent time slot (not labeled in FIG. 2) in a subframe 200 that includes two time slots includes symbols 204B, a long cyclic prefix 206B, and a short cyclic prefix 208B that are similar to the symbols 204A, long cyclic prefix 206A, and short cyclic prefixes 206A.

For N=4, the base station 134 and/or user equipment 131, 132, 133, 135 may transmit N, or 4, times the predetermined number (seven) symbols 210A, 210B (and other symbols not labeled in FIG. 2) in the time slot 202. N, or 4, symbols and cyclic prefixes generally align with a single symbol and cyclic prefix for N=1. Each of the symbols 210A, 210B may be preceded or succeeded by a cyclic prefix 212A, 214A, 212B, 214B. Long cyclic prefixes 212A, 212B may have a longer time duration than short cyclic prefixes 214A, 214B. In the example described above, the long cyclic prefixes 212A, 212B may be 160 samples long (with the 0.5 millisecond time slot 202 being divided into 61,440 samples for N=4), and the short cyclic prefixes 214A, 214B are 144 samples long, for a difference of 16 samples. The time duration of a sample may be inversely proportional to the value of the numerology parameter.

The difference in time durations for the long and short cyclic prefixes may cause the ends of the symbols and/or time slots to not align, making it not possible for the base station to synchronize signal during the time slot 202 such that symbol and/or cyclic prefix ending time is aligned between (sub-)systems with two numerology parameter values. In the example shown in the tables above, for N=1, a symbol has a period or time duration of 66.67 μs, and the first, or long cyclic prefix 206A, has a time duration of 160 samples/(15,360 samples/0.5 ms)=5.21 μs, for a total time duration of the first symbol 204A and long cyclic prefix 206A of 66.67 μs+5.21 μs=71.88 μs. For N=4, a symbol has a period or time duration of 16.67 μs, the first, or long cyclic prefix 212A, has a time duration of 160 samples/(61,440 samples/0.5 ms)=1.30 μs, and the subsequent, or short cyclic prefixes 214A, have time durations of 144 samples/(61,440 samples/0.5 ms)=1.17 μs. The total time duration of the first four symbols 210A and corresponding cyclic prefixes 212A, 212B (corresponding to the first symbol 204A and first, long cyclic prefix 206A for N=1) is 4*16.67 μs (four symbols)+1.30 μs (one long cyclic prefix)+3*1.17 μs (three short cyclic prefixes)=71.49 μs. The 71.49 μs for N=4 is less than the 71.88 μs for N=1, preventing synchronization of signals from being sent and/or performed after a symbol 204A, 210A and/or cyclic prefix for one numerology parameter value in such that symbol and/or cyclic prefix ending time is aligned with a symbol and/or cyclic prefix for another numerology parameter value.

To allow the base station 134 to synchronize signal in such that symbol and/or cyclic prefix ending time is aligned with symbols and/or cyclic prefixes for any numerology parameter value, the base station 134 and/or user equipment 131, 132, 133, 135 may reserve a time alignment period. The time alignment period may be reserved for sending a synchronization signal. The time alignment period may be reserved at the end of the first N symbols and corresponding cyclic prefixes within a time slot 202, or distributed and/or divided among each of the first N symbols within the time slot 202, such as divided by N and inserted after each of the first N symbols within the time slot 202. The total time alignment period reserved may be equal to a difference in time duration between the long cyclic prefix and the short cyclic prefixes for N=1, and/or equal to N times the difference in time duration, counted in samples, between the long cyclic prefix and the short cyclic prefixes for a given numerology parameter value N. In the example shown in the tables above, the time alignment period may be equal to N*(160 samples−144 samples)=N*16 samples.

The reservation of a total time alignment period of the difference in time duration between the long cyclic prefix and the short cyclic prefixes for N=1, and/or equal to N times the difference (for example S samples) in time duration between the long cyclic prefix and the short cyclic prefixes may ensure that the time alignment period for a higher value of N does not end until after the time alignment period for a lower value of N (such as 1) has begun. Continuing with the example described above, for N=1, the total time for the first symbol 204A and long cyclic prefix 206A is 71.88 μs. For N=4, the total time for the first four symbols 210A, the long cyclic prefix 212A and three short cyclic prefixes 214A is 71.49 μs. With the addition of 16*N samples, or 16 samples*4/(61,440 samples/0.5 ms)=0.52 μs, the total time duration of the N (4) symbols, cyclic prefixes, and time alignment period is 72.01 μs, which is greater than the 71.88 μs time duration of the symbol 204A and long cyclic prefix 206A for N=1, causing the reserved time alignment periods for N=1 and N=4 to overlap.

As N approaches infinity (N→∞), the end of the total time duration of the N samples, N cyclic prefixes, and time alignment period approaches the time duration of the single symbol and long cyclic prefix for N=1:

Symbol period $(N=1)/N*N$+long cyclic period duration $(CP_L)$+$(N-1)$*short cyclic period duration $(CP_S)$+$N$*(long cyclic period duration−short cyclic period duration)

$(CP_{L-S})$=Symbol period $(N=1)$+$CP_L$+$(N-1)CP_S$+ $NCP_L$−$NCP_S$=Symbol period $(N=1)$+$CP_L$+ $NCP_S$−$CP_S$+$NCP_L$−$NCP_S$=Symbol period $(N=1)$+$(N+1)CP_L$−$CP_S$≈Symbol period $(N=1)$+ $NCP_L$≈Symbol period $(N=1)$+$CP_L(N=1)$ where the cyclic prefix length is inversely proportional to the value of N.

The time alignment value of the difference in time duration between the long cyclic prefix and the short cyclic prefixes for N=1, and/or equal to N times the difference in time duration between the long cyclic prefix and the short cyclic prefixes for a given numerology parameter value N, is the shortest time duration that will ensure at least some overlap between time alignment periods after N symbols and corresponding cyclic prefixes for any value of N.

Figure 3:
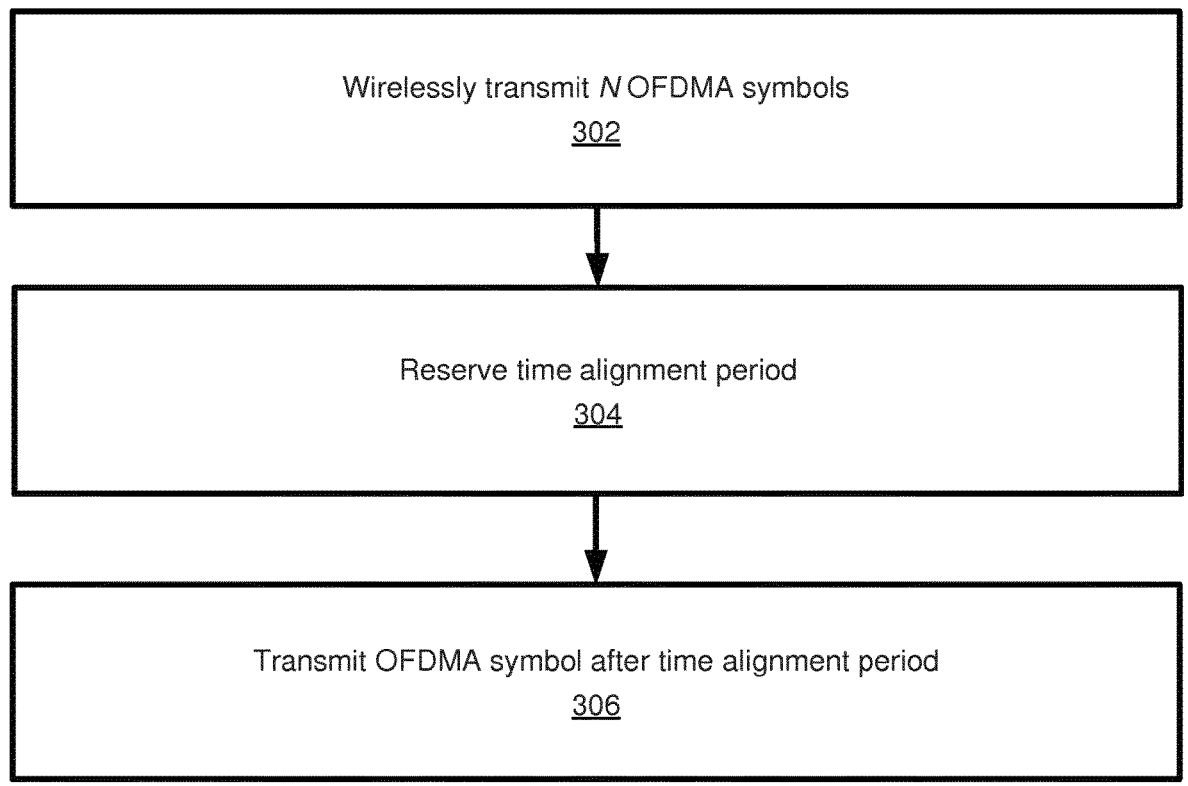
FIG. 3 is a flowchart showing a method according to an example implementation.

FIG. 3 is a flowchart showing a method according to an example implementation. The method may be performed by a network node. The method may include wirelessly transmitting, by a network node, N OFDMA symbols commencing at a beginning of a time slot, N being a first value of a numerology parameter associated with the N symbols (302). The method may include reserving a time alignment period within the time slot, the time alignment period being later than commencement of the time slot and before transmission of an N+1$^{TH}$ OFDMA symbol (304). The method may include transmitting, after the N OFDMA symbols and the time alignment period and during the time slot, the N+1$^{TH}$ OFDMA symbol without reserving another time alignment period within the time slot (306).

According to an example implementation, all OFDMA symbols may be transmitted during the time slot include a cyclic prefix, a first OFDMA symbol may be transmitted during the time slot, which is included in the N OFDMA symbols, has a first cyclic prefix time duration that is inversely proportional to N, all OFDMA symbols may be transmitted after the first OFDMA symbol and during the time slot have a second cyclic prefix time duration that is inversely proportional to the numerology parameter associated with the respective symbols, the second cyclic prefix time duration being shorter than the first cyclic my have time duration for a same numerology parameter, and the time alignment period has a time duration equal to a difference between the first cyclic prefix time duration and the second prefix time duration for a numerology parameter value of one.

According to an example implementation, the time alignment period may be reserved after the transmission of the N OFDMA symbols.

According to an example implementation, the time alignment period may be divided into N sub-alignment periods, the N sub-alignment periods each being after one of the N OFDMA symbols.

According to an example implementation, the network node may be a base station.

According to an example implementation, the network node may be a user equipment.

According to an example implementation, a time duration of the time slot may be 0.5 milliseconds.

According to an example implementation, a time alignment period may be reserved for each time slot.

According to an example implementation, the transmitting the N+1$^{TH}$ OFDMA symbol may include transmitting multiple OFDMA symbols until an end of the time slot without reserving another time alignment period within the time slot.

According to an example implementation, the method may further include transmitting a synchronization signal during the time alignment period.

According to an example implementation, a length of the time alignment period may be N*S samples, S being an integer independent of N.

According to an example implementation, a length of the time alignment period may be N*S samples, S being a difference in a number of samples for a first cyclic prefix in the time slot and subsequent cyclic prefixes in the time slot for a numerology parameter of one.

According to an example implementation, a length of the time alignment period may be N*16 samples.

According to an example implementation, a time duration of each of the samples may be inversely proportional to the value of N.

According to an example implementation, a clock rate may be N times 30.72 MegaHertz (MHz).

According to an example implementation, the numerology parameter may determine a subcarrier spacing within the N OFDMA symbols and the at least one additional OFDMA symbol.

According to an example implementation, the numerology parameter may determine a symbol duration of the N OFDMA symbols and the N+1$^{TH}$ OFDMA symbol.

According to an example implementation, the numerology parameter may determine at least one of a maximum carrier bandwidth, a clock rate, a subcarrier spacing, a symbol duration, a number of samples per time slot, a number of samples in a first cyclic prefix in each time slot, a number of samples in subsequent cyclic prefixes in each time slot, and a number of symbols per time slot.

According to an example implementation, the numerology parameter may determine a maximum carrier bandwidth, a clock rate, a subcarrier spacing, a symbol duration, a number of samples per time slot, a number of samples in a first cyclic prefix in each time slot, a number of samples in subsequent cyclic prefixes in each time slot, and a number of symbols per time slot.

According to an example implementation, the N+1$^{TH}$ symbol may be transmitted after the time alignment period and during the time slot has the numerology parameter N.

According to an example implementation, the N+1$^{TH}$ symbol may be transmitted after the time alignment period and during the time slot has a different numerology parameter than N.

According to an example implementation, the N OFDMA symbols may be included in a first data stream, and the time alignment period may be a first time alignment period associated with the first data stream. In this example, the method may further comprise wirelessly transmitting M OFDMA symbols commencing at the beginning of the time slot, M being a second value of the numerology parameter different than N and associated with the M OFDMA symbols, the M OFDMA symbols being included in a second data stream and partially overlapping in time with the N OFDMA symbols, and reserving a second time alignment period within the time slot, the second time alignment period immediately following transmission of the M OFDMA symbols and partially overlapping with the first time alignment period.

According to an example implementation, each of the OFDMA symbols may include a cyclic prefix.

According to an example implementation, a time duration of each of the N cyclic prefixes may be independent of the value of N.

According to an example implementation, a time duration of each of the N cyclic prefixes may be inversely proportional to the value of N.

According to an example implementation, a cyclic prefix of a first symbol transmitted during the time slot may have a longer time duration than subsequent symbols transmitted during the time slot.

Figure 4:
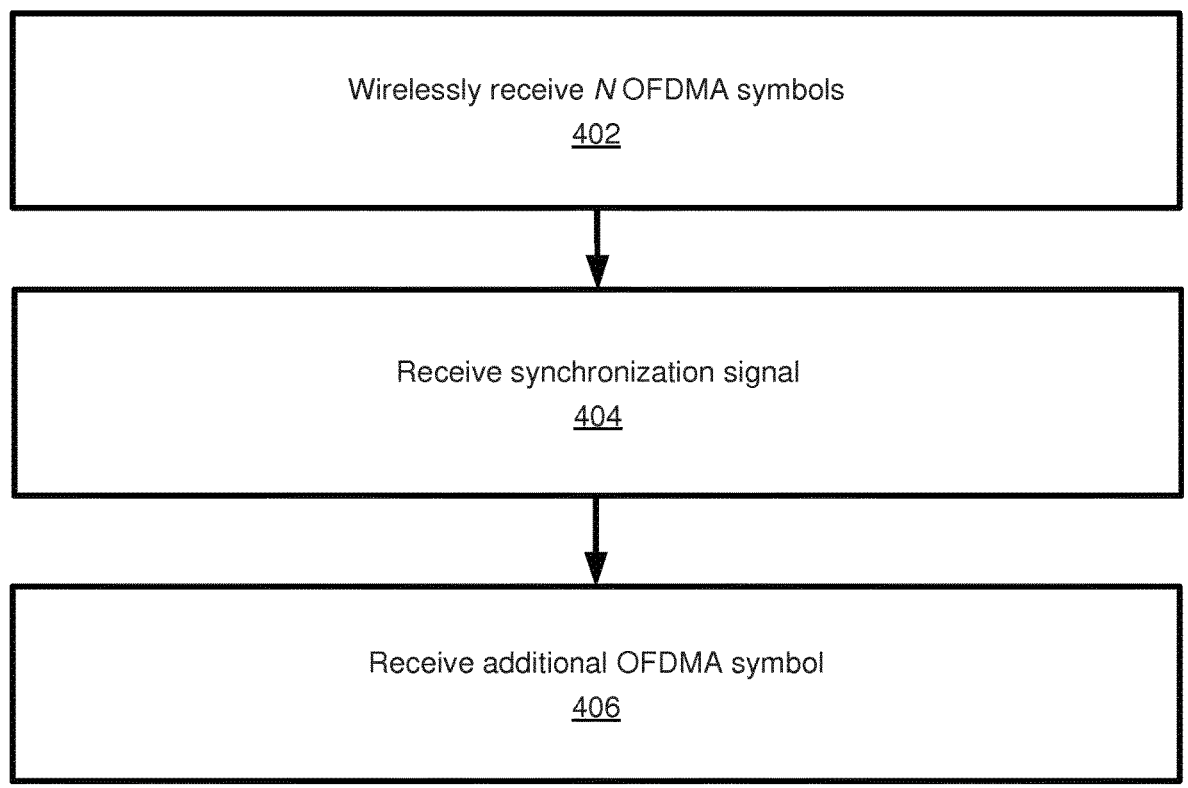
FIG. 4 is a flowchart showing a method according to another example implementation.

FIG. 4 is a flowchart showing a method according to another example implementation. The method may be performed by a user equipment. The method may include wirelessly receiving, by user equipment from a base station, N OFDMA symbols commencing at a beginning of a time slot, N being a first value of a numerology parameter associated with the N OFDMA symbols (402). The method may include receiving a synchronization signal from the base station within the time slot after receiving the N OFDMA symbols (404). The method may include reserving a time alignment period within the time slot, the time alignment period being later than commencement of the time slot and before reception of an N+1$^{TH}$ OFDMA symbol. The synchronization signal may be received during the time alignment period. The method may include receiving from the base station, after receiving the synchronization signal or after the time alignment period, or both, at least one additional OFDMA symbol, the at least one OFDMA symbol being associated with a second value M of the numerology parameter, M being a different integer value than N (406).

According to an example implementation, the method may include determining timing for the at least one additional OFDMA symbol based on at least one of the synchronization signal and the time alignment period.

Figure 5A:
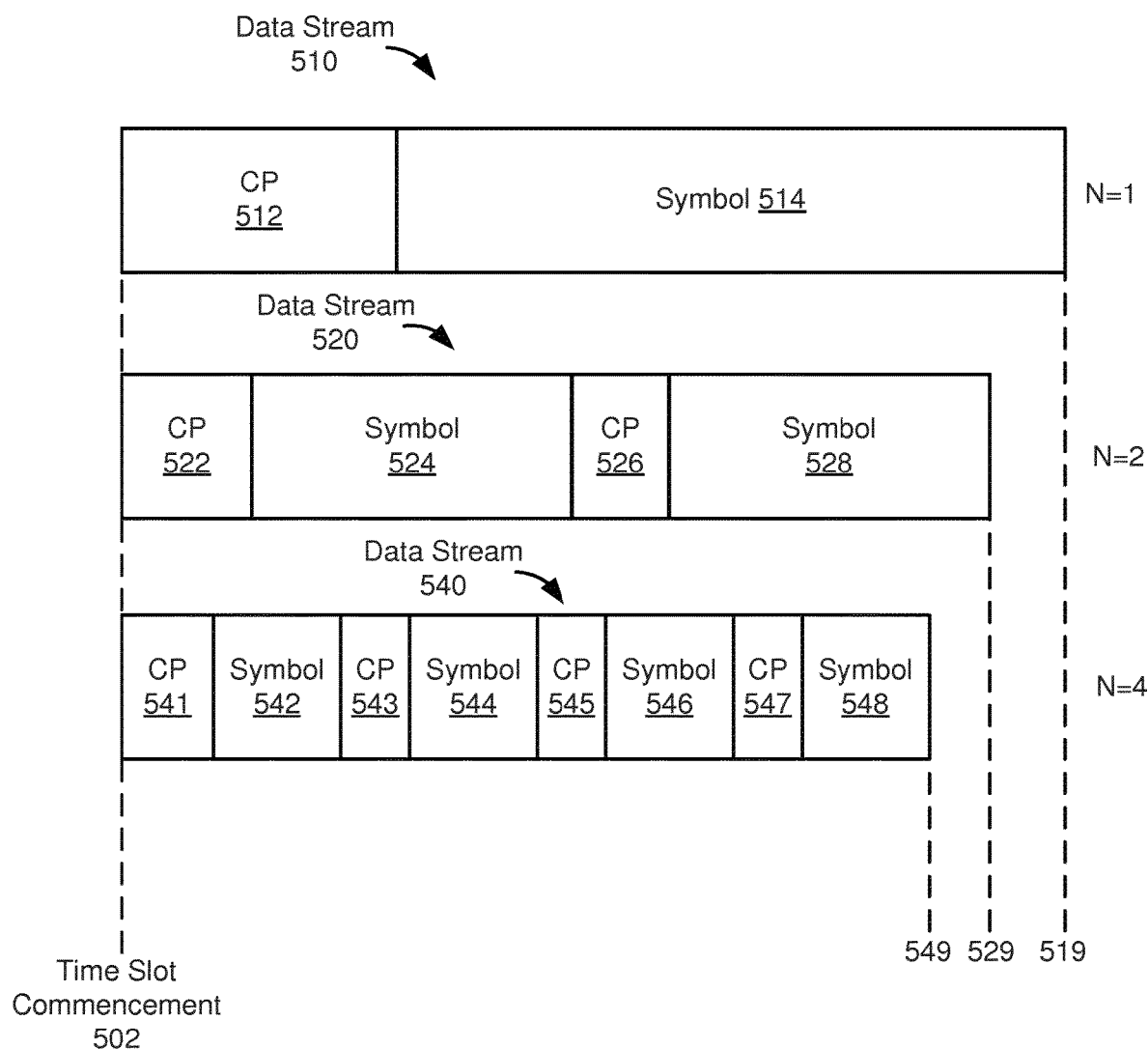
FIG. 5A is a diagram showing timing of cyclic prefixes and symbols for N=1, N=2, and N=4 according to an example implementation.

FIG. 5A is a diagram showing timing of cyclic prefixes and symbols for N=1, N=2, and N=4 according to an example implementation. Cyclic prefixes may be associated with and/or included in OFDMA symbols. The cyclic prefixes and symbols are shown for data streams 510, 520, 540 with different numerology parameters. A first data stream 510 includes a long cyclic prefix 512 and a single OFDMA symbol 514 for numerology parameter N=1. A second data stream 520 includes a long cyclic prefix 522, a first OFDMA symbol 524, a short cyclic prefix 526, and a second OFDMA symbol 528, for numerology parameter N=2. A third data stream 540 includes a long cyclic prefix 541, a first OFDMA symbol 542, a short cyclic prefix 543, a second OFDMA symbol 544, a short cyclic prefix 545, a third OFDMA symbol 546, a short cyclic prefix 547, and a fourth OFDMA symbol 548. The symbols may commence at a beginning 502 of the time slot.

The symbols 514, 524, 528, 542, 544, 546, 548 may have time durations inversely proportional to their associated numerology parameter values, causing the symbols 524, 528 to have half the time duration as the symbol 514, and the symbols 542, 544, 546, 548 to have one-fourth the time duration as the symbol 514. The long cyclic prefixes 512, 522, 541 may have time durations inversely proportional to their associated numerology parameter values, causing the long cyclic prefix 522 to have half the time duration as the long cyclic prefix 512 and the long cyclic prefix 541 to have one-fourth the time duration as the long cyclic prefix 512. The short cyclic prefix 526 may have a shorter time duration than the long cyclic prefix 522 with the same associated numerology parameter value (N=2), and the short cyclic prefixes 543, 545, 547 may have shorter time durations than the long cyclic prefix 541 with the same associated numerology parameter value (N=4). The shorter time durations of the short cyclic prefixes 526, 543, 545, 547 than the long cyclic prefixes 522, 541 with same numerology parameter values may cause the total time durations of symbols and cyclic prefixes to be shorter for higher numerology parameter values, as shown by the ending times 549, 529, 519 for N=4, N=2, and N=1, respectively. As discussed above with respect to the example of FIG. 2, total time duration of the symbol 512 and long cyclic prefix 514 for N=1 may be 71.88 µs, the total time duration of the symbols 542, 544, 546, 548 and cyclic prefixes 541, 543, 545, 547 for N=4 may be 71.49 µs, and the total time duration of the symbols 524, 528 and cyclic prefixes 522, 526 for N=2 may be 2*33.33 µs+160 samples/(30,720 samples/0.5 ms)+144 samples/(30,720 samples/0.5 ms)=66.66 µs+2.60 µs+2.34 µs=71.60 µs, with the end time 529 for the data stream 520 with N=2 falling between the end times 549, 519 of the data streams 540, 510 for N=4 and N=1, respectively.

Figure 5B:
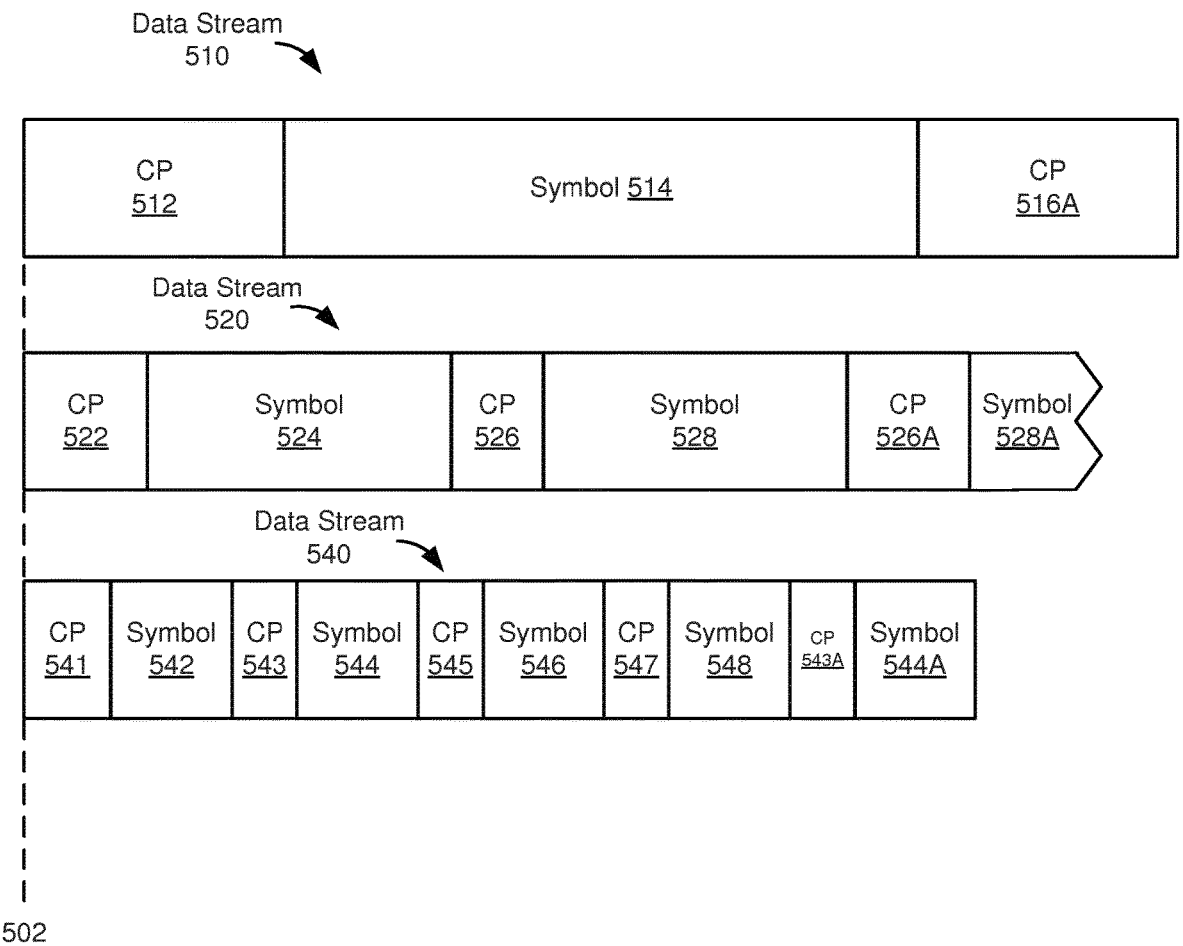
FIG. 5B is another diagram showing timing of cyclic prefixes and symbols for N=1, N=2, and N=4 according to an example implementation.

FIG. 5B is another diagram showing timing of cyclic prefixes and symbols for N=1, N=2, and N=4 according to an example implementation. In this example, cyclic prefixes 516A, 526A, 543A and N+1$^{TH}$ symbols 528A, 544A have been added after the cyclic prefixes 512, 522, 526, 541, 543, 545, 547 and symbols 514, 524, 528, 542, 544, 546, 548 shown and described with respect to FIG. 5A. As shown in FIG. 5B, after the commencement 502 of the time slot, there is no time synchronism between a cyclic prefix or symbol of at least one data stream 510, 520, 540.

Figure 5C:
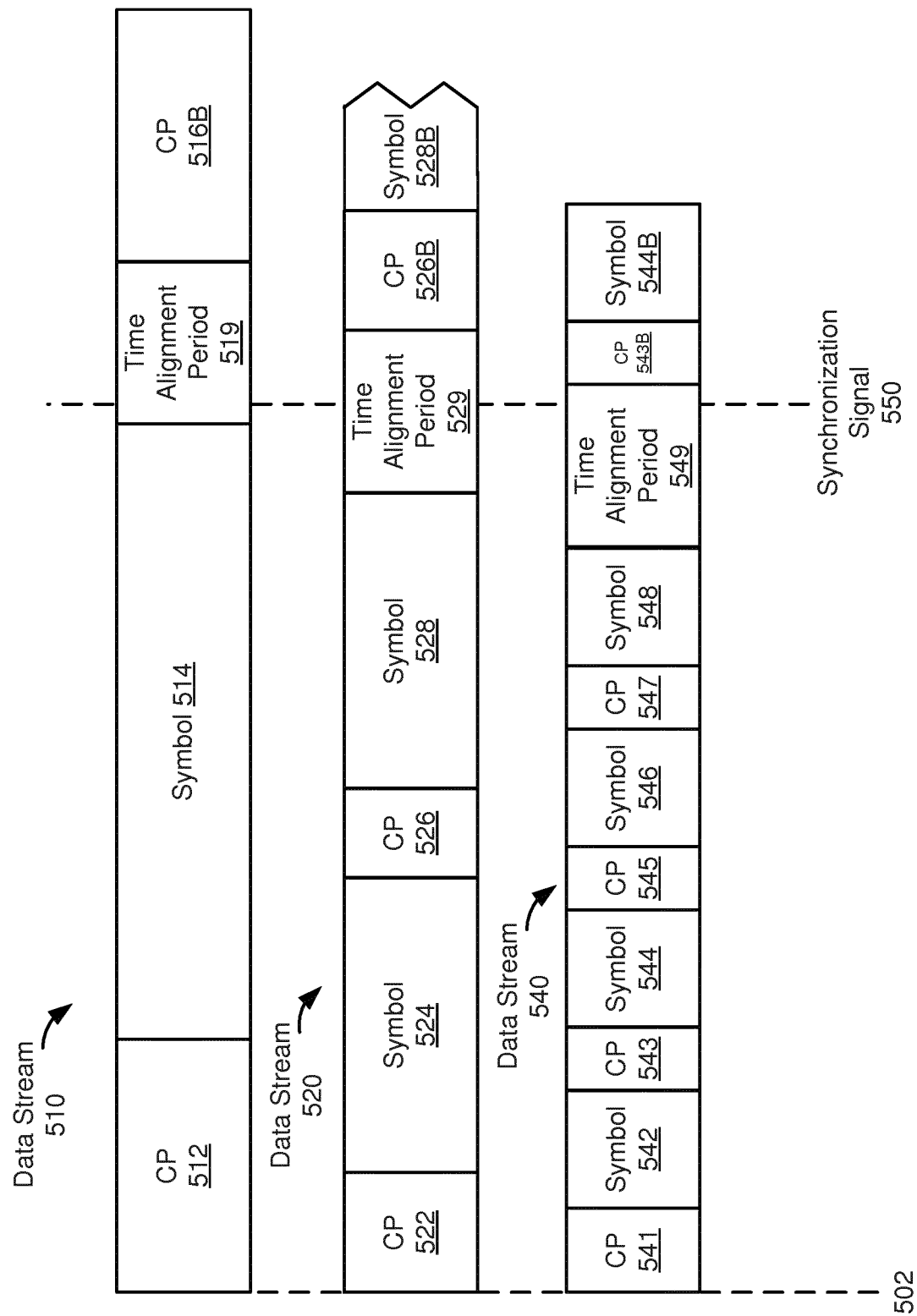
FIG. 5C is a diagram showing timing of cyclic prefixes and symbols for N=1, N=2, and N=4 with an addition of a time alignment period after N symbols according to an example implementation.

FIG. 5C is a diagram showing timing of cyclic prefixes and symbols for N=1, N=2, and N=4 with an addition of a time alignment period 519, 529, 549 after N symbols according to an example implementation. The time alignment periods 519, 529, 549 have been added after the cyclic prefixes 512, 522, 526, 541, 543, 545, 547 and symbols 514, 524, 528, 542, 544, 546, 548 shown and described with respect to FIG. 5A and before N+1$^{TH}$ OFDMA symbols 528B, 544B and/or cyclic prefixes 516B, 526B, 543B. While not drawn to scale in FIG. 5C, the time alignment periods 519, 529, 549 have the same duration for all of the data streams 510, 520, 540, and have a time duration equal to the difference between the long cyclic prefix 512 and short cyclic prefix 516B for the first data stream 510 in which the numerology parameter N=1, and/or has a duration of N times the difference between the time duration of the short cyclic prefix 512, 522, 541 and the long cyclic prefix 516B, 626, 543, 545, 547 for each data stream 510, 520, 540, which in the example described with respect to the above tables, is N*16 samples. The N+1$^{TH}$ OFDMA symbols may be transmitted without reserving another time alignment period within the time slot.

As shown in FIG. 5C, the time alignment periods 529, 549 for data streams 520, 540 for which the numerology parameter N is greater than one begin before the first cyclic prefix 512 and first symbol 514 have completed for the data stream 510 for which the numerology parameter N=1, and end after the first cyclic prefix 512 and first symbol 514 have completed for the data stream 510 for which the numerology parameter N=1. There is therefore overlap between the time alignment periods 519, 529, 549 for all values of N. This allows a synchronization signal 550 to be sent during a portion of the overlapping time alignment periods 519, 529, 549, allowing the network nodes to synchronize their timings and/or clocks without interfering with the transmission and/or reception of any symbols or cyclic prefixes. An N+1$^{TH}$ symbol 528B, 544B and/or cyclic prefix 516B, 526B, 543B may be transmitted after the time alignment period 519, 529, 549, and may have a same or different numerology parameter value N as previous symbols and cyclic prefixes in the respective data stream 510, 520, 540.

Figure 5D:
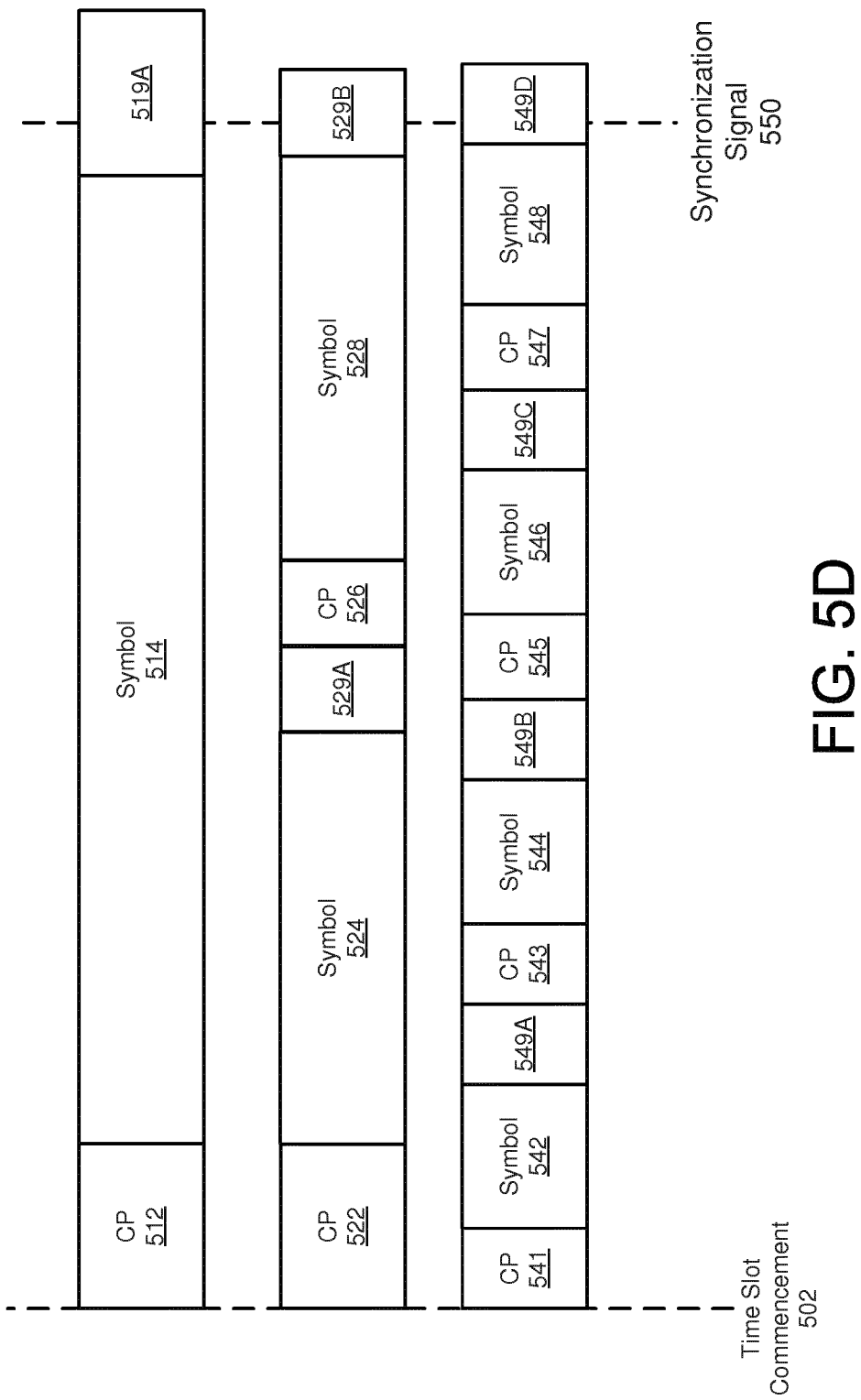
FIG. 5D is a diagram showing timing of cyclic prefixes and symbols for N=1, N=2, and N=4 with addition of N time alignment periods according to an example implementation.

FIG. 5D is a diagram showing timing of cyclic prefixes and symbols for N=1, N=2, and N=4 with addition of N time alignment periods according to an example implementation. The N time alignment periods may be considered sub-alignment periods. In this example, the first data stream 510, for which the numerology parameter N=1, has a single time alignment period 519A after the symbol 514, the second data stream 520, for which the numerology parameter N=2, has two time alignment periods 529A, 529B, one after reach symbol 524, 528, and the third data stream 540, for which the numerology parameter N=4, has four time periods 549A, 549B, 549C, 549D, one after reach symbol 542, 544, 546, 548. The time alignment periods 519A, 529A, 529B, 549A, 549B, 549C, 549D have time durations equal to the time durations of the time alignment periods 519, 529, 540 shown and described with respect to FIG. 5C for a given N value, divided by N. As shown in FIG. 5D, the last time alignment periods 519A, 529B, 549D for each data stream 510, 520, 540 overlap, allowing the synchronization signal to be sent during the time period 550 without interfering with the transmission and/or reception of any symbols or cyclic prefixes.

FIG. 6 is a diagram showing coexistence of numerologies for N=1, N=2, N=4, and N=¼ according to an example implementation. This diagram shows the data stream 510 for which the numerology parameter N=1, the data stream 520 for which N=2, and the data stream 540 for which N=4. For these values of N, the time alignment period 609, 629, during which a synchronization signal may be transmitted, is scheduled and/or reserved after the first N symbols within a time slot 402A, 402B. For a data stream 560, for which the numerology parameter N is a fraction, such as ¼ in the example shown in FIG. 6, the time alignment period 619 is scheduled and/or reserved after a first symbol for the data stream 560, which is after the first N (data stream 510, 520, 540 which has an N value greater than or equal to one)/N (data stream 560 for which N is a fraction of one) symbols for data streams 510, 520, 540 which have an N value greater than or equal to one.

Figure 7:
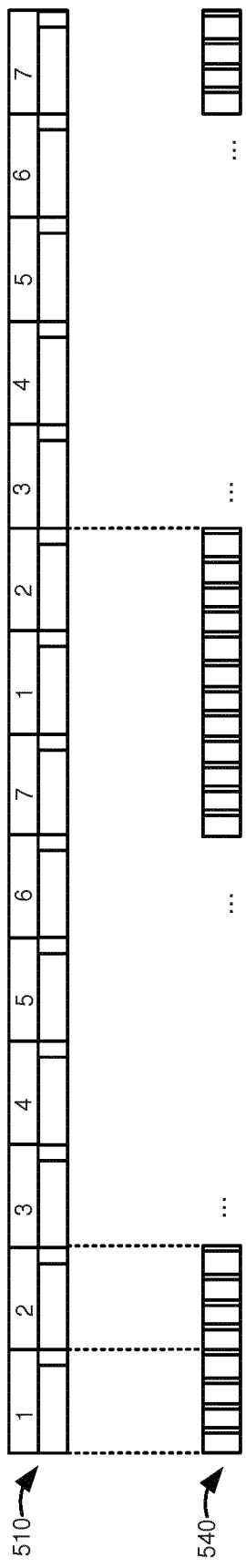
FIG. 7 is a diagram showing coexistence of numerologies for N=1 and N=4 according to an example implementation.

FIG. 7 is a diagram showing coexistence of numerologies for N=1 and N=4 according to an example implementation. As shown in FIG. 7, the symbols and corresponding cyclic prefixes are scaled by the value of N, so in data stream 540, for which N is four, four symbols and cyclic prefixes are transmitted during each time period during which a single symbol and cyclic prefix is transmitted in the data stream 510, for which N=1.

Figure 8:
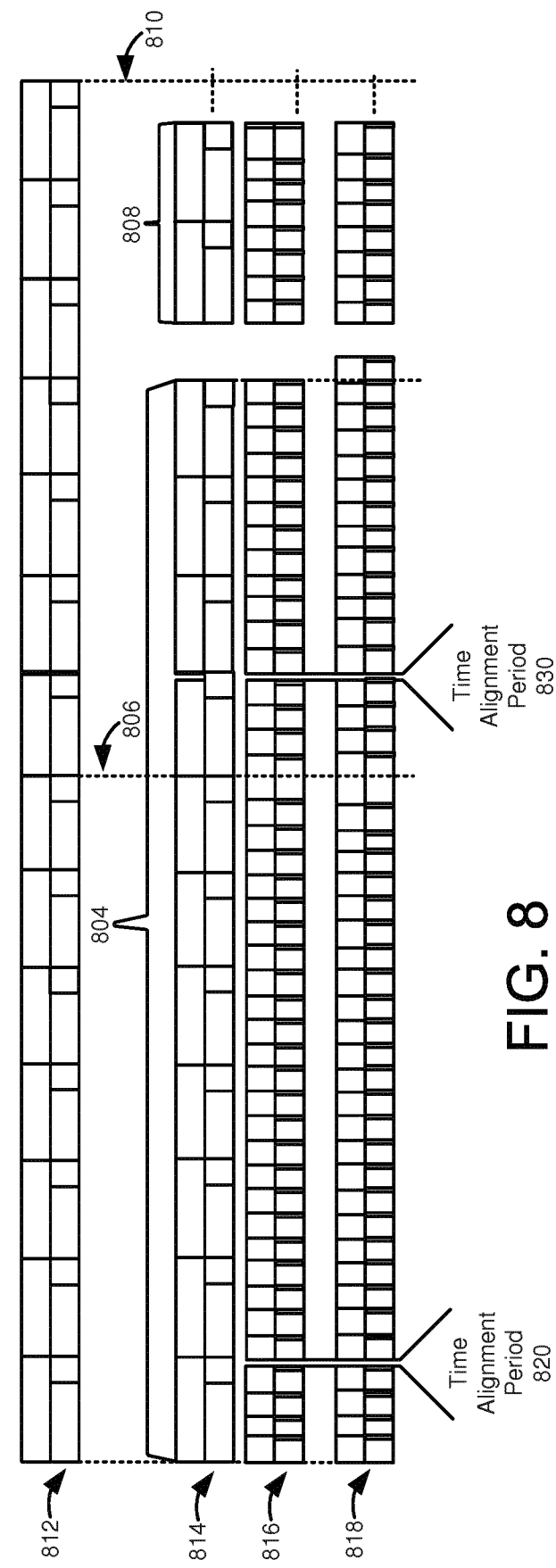
FIG. 8 is a diagram showing coexistence of 5G numerology (N=4) and a Long-term Evolution (LTE) special subframe according to an example implementation.

FIG. 8 is a diagram showing coexistence of 5G numerology (N=4) and a Long-term Evolution (LTE) special subframe according to an example implementation. FIG. 8 shows a full LTE subframe 812 in the first row, and LTE special subframe 814 in the second row (which includes a downlink pilot time slot (DwPTS) 804 and an uplink pilot time slot (UpPTS) 808), a transmission 816 according to 5G operation with N equal to 4 in a first option in the third row, and a transmission 818 according to 5G operation with N=4 in a second option in the fourth row. The time alignment period 820 may be reserved and/or scheduled after a single symbol in the LTE special subframe 814 and after a first symbol after a beginning and/or end 806 of a time slot in the LTE special subframe 814.

Aligning the N*16 reserved samples minimizes interference leakage between different systems, such as when multiple numerologies are applied simultaneously and/or concurrently in different cells (either in a co-channel scenario or in an adjacent channel scenario), and minimizes a guard period (in a time division duplexing (TDD) scenario) where the same hardware cannot transmit and receive simultaneously.

As shown in the example of FIG. 8 with N=4, N*16 samples may be aligned between LTE and 5G operations. In uplink (UL) and downlink (DL) transmissions, a guard period (with both DL→UL and UL→DL) may be aligned between the two (LTE and 5G) systems. The alignment of the guard period may require an advanced timing principle and a timing advance (TA) 810 value aligned such that reception of symbol timing of the two systems is aligned in symbol granularity. Two options may include a first option (816) in which downlink, guard period, and uplink parts are fully aligned, and a second option (818) with partial alignment of the downlink, guard period, and uplink parts. The second option, partial alignment, may allow shorter symbol length, with one or more additional symbols transmitted during guard periods of longer symbol length. The symbols transmitted during guard periods of longer symbol length may be included in downlink and/or in a downlink portion of the transmission.

Different subframe/transmission time interval (TTI) structures may be defined on top of the time alignment period 820, 830. The subframe may be defined to be a unit consisting of M OFDMA symbols. Subframes may be downlink only, uplink only, and bi-directional. A bi-directional subframe may include downlink, guard period, and uplink parts with configurable length (length may be measured in terms of OFDMA symbols). N*16 samples may be reserved periodically (such as once per time slot, which may be 0.5 milliseconds). The reserved N*16 samples which may be reserved as a time alignment period may be available for other purposes, and may not be used for determining the subframe/TTI length. A subframe length may be defined to be seven symbols, regardless of carrier spacing.

Reserving the time alignment period may allow smooth coexistence of different numerologies based on a common clock rate, which may be N*30.71 Msamples/second. The location of the N*16 samples/slot interval may be aligned among the available numerology options. To maximize coexistence between LTE transmissions with different N values, the N*16 reserved samples may be within N*(2, 048+160) first samples of the time interval. A first option may be to have the N*16 samples located within the first data symbol of the time interval and/or time slot (such as at the end of the first data symbol), as shown in FIG. 6. A second option may be to divide the N*16 samples between the first N symbols of the time interval (and/or based on a ratio between clock rates between aligned symbol durations), as shown in FIG. 7. A third option may be to divide the N*16 samples between an NI data block within the time slot. If coexistence between LTE transmissions with different N values is not required, then the N*16 samples may be distributed throughout the time slot.

Reserving the time alignment period may maximize commonality with LTE hardware implementation, such as by leveraging a common clock. Reserving the time alignment period may allow implementation-friendly scaling for 5G numerology. Reserving the time alignment period may maximize commonality with TD-LTE. Reserving the time alignment period may allow aligning not only subframes/slots between LTE and 5G but also between LTE symbols. The alignment between LTE symbols may allow smooth coexistence between TD-LTE and 5G during special subframes, such as DwPTS and/or UpPTS. Reserving the time alignment period may support coexistence of different numerologies on a same bandwidth and/or contiguous spectrum while keeping a same subcarrier spacing (such as 15 kHz).

Figure 9:
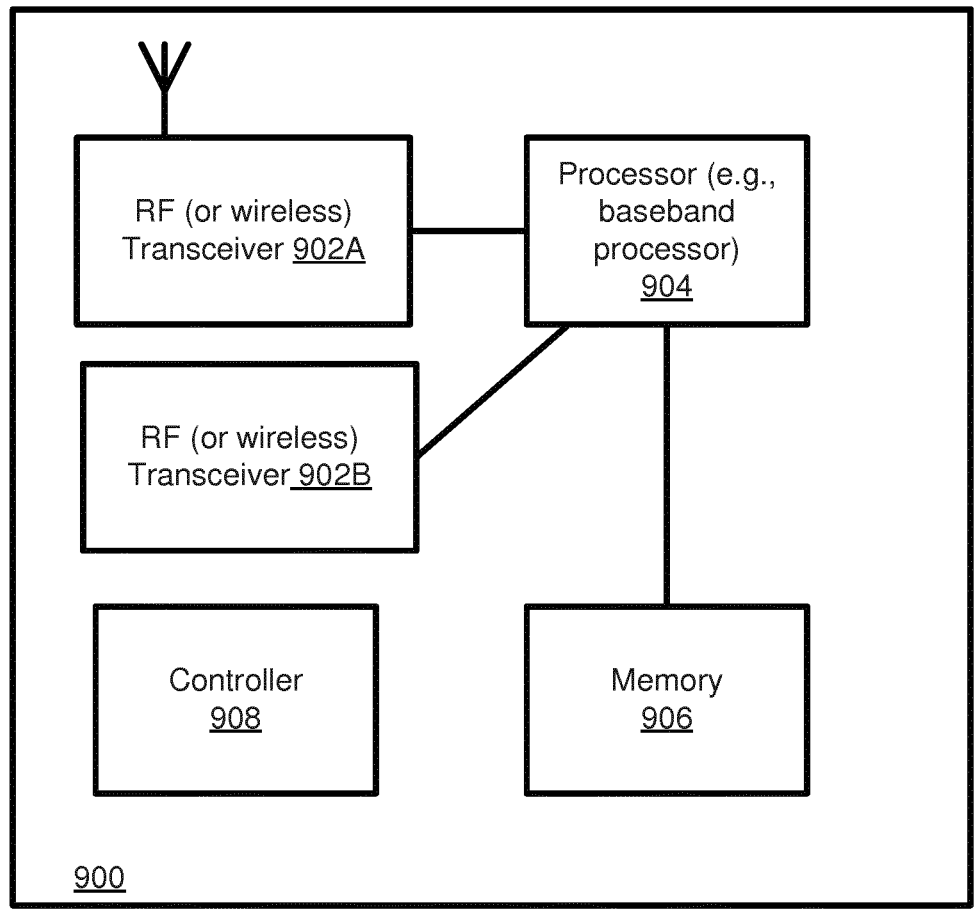
FIG. 9 is a block diagram of a wireless station according to an example implementation.

FIG. 9 is a block diagram of a wireless station (e.g., AP or user device) 900 according to an example implementation. The wireless station 900 may include, for example, one or two RF (radio frequency) or wireless transceivers 902A, 902B, where each wireless transceiver includes a transmitter to transmit signals and a receiver to receive signals. The wireless station also includes a processor or control unit/entity (controller) 904 to execute instructions or software and control transmission and receptions of signals, and a memory 906 to store data and/or instructions.

Processor 904 may also make decisions or determinations, generate frames, packets or messages for transmission, decode received frames or messages for further processing, and other tasks or functions described herein. Processor 904, which may be a baseband processor, for example, may generate messages, packets, frames or other signals for transmission via wireless transceiver 902 (902A or 902B). Processor 904 may control transmission of signals or messages over a wireless network, and may control the reception of signals or messages, etc., via a wireless network (e.g., after being down-converted by wireless transceiver 902, for example). Processor 904 may be programmable and capable of executing software or other instructions stored in memory or on other computer media to perform the various tasks and functions described above, such as one or more of the tasks or methods described above. Processor 904 may be (or may include), for example, hardware, programmable logic, a programmable processor that executes software or firmware, and/or any combination of these. Using other terminology, processor 904 and transceiver 902 together may be considered as a wireless transmitter/receiver system, for example.

In addition, referring to FIG. 9, a controller (or processor) 908 may execute software and instructions, and may provide overall control for the station 900, and may provide control for other systems not shown in FIG. 9, such as controlling input/output devices (e.g., display, keypad), and/or may execute software for one or more applications that may be provided on wireless station 900, such as, for example, an email program, audio/video applications, a word processor, a Voice over IP application, or other application or software.

In addition, a storage medium may be provided that includes stored instructions, which when executed by a controller or processor may result in the processor 904, or other controller or processor, performing one or more of the functions or tasks described above.

According to another example implementation, RF or wireless transceiver(s) 902A/902B may receive signals or data and/or transmit or send signals or data. Processor 904 (and possibly transceivers 902A/902B) may control the RF or wireless transceiver 902A or 902B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

According to an example implementation, an apparatus (900) such as a network node, may include means for (902A, 902B, 904) wirelessly transmitting, by a network node, N OFDMA symbols commencing at a beginning of a time slot, N being a first value of a numerology parameter associated with the N symbols (302), means for (902A, 902B, 904) reserving a time alignment period within the time slot, the time alignment period being later than commencement of the time slot and before transmission of an N+1$^{TH}$ OFDMA symbol (304), and means for (902A, 902B, 904) transmitting, after the N OFDMA symbols and the time alignment period and during the time slot, the N+1$^{TH}$ OFDMA symbol without reserving another time alignment period within the time slot (306).

According to an example implementation, all OFDMA symbols may be transmitted during the time slot include a cyclic prefix, a first OFDMA symbol may be transmitted during the time slot, which is included in the N OFDMA symbols, has a first cyclic prefix time duration that is inversely proportional to N, all OFDMA symbols may be transmitted after the first OFDMA symbol and during the time slot have a second cyclic prefix time duration that is inversely proportional to the numerology parameter associated with the respective symbols, the second cyclic prefix time duration being shorter than the first cyclic my have time duration for a same numerology parameter, and the time alignment period has a time duration equal to a difference between the first cyclic prefix time duration and the second prefix time duration for a numerology parameter value of one.

According to an example implementation, the time alignment period may be reserved after the transmission of the N OFDMA symbols.

According to an example implementation, the time alignment period may be divided into N sub-alignment periods, the N sub-alignment periods each being after one of the N OFDMA symbols.

According to an example implementation, the network node may be a base station.

According to an example implementation, the network node may be a user equipment.

According to an example implementation, a time duration of the time slot may be 0.5 milliseconds.

According to an example implementation, a time alignment period may be reserved for each time slot.

According to an example implementation the transmitting the N+1$^{TH}$ OFDMA symbol may include transmitting multiple OFDMA symbols until an end of the time slot without reserving another time alignment period within the time slot.

According to an example implementation, the apparatus may further include means for (902A, 902B, 904) transmitting a synchronization signal during the time alignment period.

According to an example implementation, a length of the time alignment period may be N*S samples, S being an integer independent of N.

According to an example implementation, a length of the time alignment period may be N*S samples, S being a difference in a number of samples for a first cyclic prefix in the time slot and subsequent cyclic prefixes in the time slot for a numerology parameter of one.

According to an example implementation, a length of the time alignment period may be N*16 samples.

According to an example implementation, a time duration of each of the samples may be inversely proportional to the value of N.

According to an example implementation, a clock rate may be N times 30.72 MegaHertz (MHz).

According to an example implementation, the numerology parameter may determine a subcarrier spacing within the N OFDMA symbols and the at least one additional OFDMA symbol.

According to an example implementation, the numerology parameter may determine a symbol duration of the N OFDMA symbols and the N+1$^{TH}$ OFDMA symbol.

According to an example implementation, the numerology parameter may determine at least one of a maximum carrier bandwidth, a clock rate, a subcarrier spacing, a symbol duration, a number of samples per time slot, a number of samples in a first cyclic prefix in each time slot, a number of samples in subsequent cyclic prefixes in each time slot, and a number of symbols per time slot.

According to an example implementation, the numerology parameter may determine a maximum carrier bandwidth, a clock rate, a subcarrier spacing, a symbol duration, a number of samples per time slot, a number of samples in a first cyclic prefix in each time slot, a number of samples in subsequent cyclic prefixes in each time slot, and a number of symbols per time slot.

According to an example implementation, the N+1$^{TH}$ symbol may be transmitted after the time alignment period and during the time slot has the numerology parameter N.

According to an example implementation, the N+1$^{TH}$ symbol may be transmitted after the time alignment period and during the time slot has a different numerology parameter than N.

According to an example implementation, the N OFDMA symbols may be included in a first data stream, and the time alignment period may be a first time alignment period associated with the first data stream. In this example, the apparatus may further include means for (902A, 902B, 904) wirelessly transmitting M OFDMA symbols commencing at the beginning of the time slot, M being a second value of the numerology parameter different than N and associated with the M OFDMA symbols, the M OFDMA symbols being included in a second data stream and partially overlapping in time with the N OFDMA symbols, and means for (902A, 902B, 904) reserving a second time alignment period within the time slot, the second time alignment period immediately following transmission of the M OFDMA symbols and partially overlapping with the first time alignment period.

According to an example implementation, each of the OFDMA symbols may include a cyclic prefix.

According to an example implementation, a time duration of each of the N cyclic prefixes may be independent of the value of N.

According to an example implementation, a time duration of each of the N cyclic prefixes may be inversely proportional to the value of N.

According to an example implementation, a cyclic prefix of a first symbol transmitted during the time slot may have a longer time duration than subsequent symbols transmitted during the time slot.

According to an example implementation, an apparatus (900) such as a network node, may include means for (902A, 902B, 904) wirelessly receiving, by user equipment from a base station, N OFDMA symbols commencing at a beginning of a time slot, N being a first value of a numerology parameter associated with the N OFDMA symbols (402), means for (902A, 902B, 904) receiving a synchronization signal from the base station within the time slot after receiving the N OFDMA symbols (404), means for (902A, 902B, 904) reserving a time alignment period within the time slot, the time alignment period being later than commencement of the time slot and before reception of an N+1$^{TH}$ OFDMA symbol and means for (902A, 902B, 904) receiving from the base station, after receiving the synchronization signal or after the time alignment period, or both, at least one additional OFDMA symbol, the at least one OFDMA symbol being associated with a second value M of the numerology parameter, M being a different integer value than N (406).

According to an example implementation, apparatus 900 may further include means for (902A, 902B, 904) determining timing for the at least one additional OFDMA symbol based on the synchronization signal.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
    wirelessly transmitting, by a network node, N orthogonal frequency division multiple access (OFDMA) symbols commencing at a beginning of a 0.5 millisecond duration, N being a first value of a numerology parameter associated with the N symbols;
    reserving a time alignment period within the 0.5 millisecond duration, the time alignment period being later than commencement of the 0.5 millisecond duration and before transmission of an N+1$^{TH}$ OFDMA symbol; and
    transmitting, after the N OFDMA symbols and the time alignment period and during the 0.5 millisecond duration, the N+1$^{TH}$ OFDMA symbol without reserving another time alignment period within the 0.5 millisecond duration;
    wherein:
    all OFDMA symbols transmitted during the 0.5 millisecond duration include a cyclic prefix;
    a first OFDMA symbol transmitted during 0.5 millisecond duration, which is included in the N OFDMA symbols, has a first cyclic prefix time duration that is inversely proportional to N;
    all OFDMA symbols transmitted after the first OFDMA symbol and during 0.5 millisecond duration slot have a second cyclic prefix time duration that is inversely proportional to the numerology parameter associated with the respective symbols, the second cyclic prefix time duration being shorter than the first cyclic prefix time duration for a same numerology parameter; and
    the time alignment period has a time duration equal to a difference between the first cyclic prefix time duration and the second prefix time duration for a numerology parameter value of one.

2. The method of claim 1, wherein the transmitting the N+1$^{TH}$ OFDMA symbol includes transmitting multiple OFDMA symbols until an end of the 0.5 millisecond duration without reserving another time alignment period within the 0.5 millisecond duration.

3. The method of claim 1, wherein a time alignment period is reserved for each 0.5 millisecond duration.

4. The method of claim 1, wherein a length of the time alignment period is N*S samples, S being an integer independent of N.

5. The method of claim 1, wherein a length of the time alignment period is N*S samples, S being a difference in a number of samples for a first cyclic prefix in the 0.5 millisecond duration and subsequent cyclic prefixes in the 0.5 millisecond duration for a numerology parameter of one.

6. The method of claim 1, wherein a length of the time alignment period is N*16 samples.

7. The method of claim 1, wherein the numerology parameter determines a subcarrier spacing within the N OFDMA symbols and the at least one additional OFDMA symbol.

8. The method of claim 1, wherein the numerology parameter determines at least one of:
    a maximum carrier bandwidth;
    a clock rate;
    a subcarrier spacing;
    a symbol duration;
    a number of samples per 0.5 millisecond duration;
    a number of samples in a first cyclic prefix in each 0.5 millisecond duration;
    a number of samples in subsequent cyclic prefixes in each 0.5 millisecond duration; and
    a number of symbols per 0.5 millisecond duration.

9. The method of claim 1, wherein:
    the N OFDMA symbols are included in a first data stream;
    the time alignment period is a first time alignment period associated with the first data stream; and
    the method further comprises:
    wirelessly transmitting M OFDMA symbols commencing at the beginning of the 0.5 millisecond duration, M being a second value of the numerology parameter different than N and associated with the M OFDMA symbols, the M OFDMA symbols being included in a second data stream and partially overlapping in time with the N OFDMA symbols; and reserving a second time alignment period within the 0.5 millisecond duration, the second time alignment period immediately following transmission of the M OFDMA symbols and partially overlapping with the first time alignment period.

10. The method of claim 1, wherein each of the OFDMA symbols includes a cyclic prefix.

11. The method of claim 1, wherein a cyclic prefix of a first symbol transmitted during the 0.5 millisecond duration has a longer time duration than subsequent symbols transmitted during the 0.5 millisecond duration.

12. A non-transitory computer-readable storage medium comprising instructions that, when executed by at least one processor, are configured to cause a network node to perform the method of claim 1.

13. An apparatus comprising:
at least one processor; and
a non-transitory computer-readable storage medium comprising instructions that, when executed by the at least one processor, are configured to cause a network node to perform the method of claim 1.

14. A method comprising:
wirelessly receiving, by user equipment from a base station, N orthogonal frequency division multiple access (OFDMA) symbols commencing at a beginning of a 0.5 millisecond duration, N being a first value of a numerology parameter associated with the N OFDMA symbols;

reserving a time alignment period within the 0.5 millisecond duration, the time alignment period being later than commencement of the 0.5 millisecond duration and before reception of an $N+1^{TH}$ OFDMA symbol; and receiving from the base station, after the time alignment period, at least one additional OFDMA symbol, the at least one OFDMA symbol being associated with a second value M of the numerology parameter, M being a different integer value than N, wherein:

all OFDMA symbols received during the 0.5 millisecond duration include a cyclic prefix;

a first OFDMA symbol received during the 0.5 millisecond duration, which is included in the N OFDMA symbols, has a first cyclic prefix time duration that is inversely proportional to N;

all OFDMA symbols received after the first OFDMA symbol and during the 0.5 millisecond duration have a second cyclic prefix time duration that is inversely proportional to the numerology parameter associated with the respective symbols, the second cyclic prefix time duration being shorter than the first cyclic prefix time duration for a same numerology parameter; and the time alignment period has a time duration equal to a difference between the first cyclic prefix time duration and the second prefix time duration for a numerology parameter value of one.

* * * * *